US009998714B2

(12) United States Patent
Platzer

(10) Patent No.: US 9,998,714 B2
(45) Date of Patent: Jun. 12, 2018

(54) DEVICE AND METHOD FOR DETECTING, MONITORING AND/OR CONTROLLING RACING VEHICLES

(71) Applicant: AMUSYS AMUSEMENT SYSTEMS ELECTRONICS GMBH, Hoersching (AT)

(72) Inventor: Peter Platzer, Linz (AT)

(73) Assignee: NOVOMATIC AG, Gumpoldskirchen (AT)

( * ) Notice: Subject to any disclaimer, the term of this patent is extended or adjusted under 35 U.S.C. 154(b) by 0 days. days.

(21) Appl. No.: 15/377,609

(22) Filed: Dec. 13, 2016

(65) Prior Publication Data

US 2017/0195642 A1    Jul. 6, 2017

Related U.S. Application Data

(63) Continuation of application No. 13/816,392, filed as application No. PCT/EP2011/003804 on Jul. 28, 2011, now abandoned.

(30) Foreign Application Priority Data

Aug. 12, 2010   (DE) .................... 20 2010 011 317 U

(51) Int. Cl.
| | |
|---|---|
| *H04N 7/18* | (2006.01) |
| *G11B 27/28* | (2006.01) |
| *A63H 18/00* | (2006.01) |

(52) U.S. Cl.
CPC ........... *H04N 7/188* (2013.01); *A63H 18/005* (2013.01); *G11B 27/28* (2013.01); *H04N 7/183* (2013.01)

(58) Field of Classification Search
CPC ...... H04N 7/18; H04N 21/2187; H04N 7/181; H04N 21/21805; H04N 21/23614; H04N 21/2365; H04N 21/4223; H04N 21/812; H04N 5/247; H04N 5/2253; H04N 5/2254; H04N 5/23206; H04N 5/23229; H04N 5/23245; H04N 5/28; H04N 5/38; H04N 5/44; H04N 5/77
USPC ....... 348/157, 154, 159, 148, 135, 142, 143, 348/145; 382/105, 103, 162, 209, 216
See application file for complete search history.

(56) References Cited

U.S. PATENT DOCUMENTS

| | | | |
|---|---|---|---|
| 7,106,360 B1* | 9/2006 | Frederick ...................... 348/157 |
| 8,456,527 B2* | 6/2013 | Elangovan et al. .......... 348/157 |

* cited by examiner

*Primary Examiner* — Trang U Tran
(74) *Attorney, Agent, or Firm* — Brooks Kushman P.C.

(57) ABSTRACT

A device and a method for detecting, monitoring and/or controlling racing vehicles on a racetrack, having a camera for monitoring when a predetermined track section is crossed, a recording device for recording the images provided by the camera, a recording control device for automatically recording the images provided by the camera only during a specific time window within which the crossing of the track section, and a sensor device for detecting the crossing of the track section. A marking device generates a marking for a recorded image as a function of a sensor signal of the sensor device and the occurrence thereof in the specific time window. The marking is stored in an event list. An image of interest can be simply selected on the basis of the associated marking, without the images which are provided by the camera having to be evaluated themselves for this purpose.

10 Claims, 3 Drawing Sheets

DEVICE AND METHOD FOR DETECTING, MONITORING AND/OR CONTROLLING RACING VEHICLES

CROSS-REFERENCE TO RELATED APPLICATIONS

This application is a continuation of U.S. application Ser. No. 13/816,392 filed Feb. 11, 2013, which is the national phase of PCT/EP2011/003804 filed Jul. 28, 2011, which claims priority to DE 202010011317.2 filed Aug. 12, 2010, the disclosures of which are hereby incorporated in its(their) entirety by reference herein.

TECHNICAL FIELD

The present invention relates to a method and a device for the detection, monitoring and/or controlling of racing vehicles on a racetrack, wherein a respective racing vehicle is monitored with at least one camera when traversing a predetermined section of track, in particular the starting line and/or finishing line, wherein the images provided by the camera are recorded using a recording device.

BACKGROUND

Such control and monitoring devices are especially used with model racetracks, in particular so-called slot car tracks, but can in principle also be used on real racetracks and the racing vehicles that are driving on them. As racing vehicles various vehicle types, e.g. automobiles or motorcycles, naturally come into consideration, but in principal other race objects, such as for example horses, harness racing carriages or waterborne vehicles such as racing boats can be equipped or monitored and detected with corresponding devices, so that the term racing vehicle is to be broadly interpreted in the context of the present application.

Racing on racetracks is usually monitored with the assistance of technical recording means and controlled with corresponding control modules, which concerns e.g. the detection of the number of laps covered and/or the lap time or the identification of a respective vehicle or of a driver associated with said vehicle. In addition to the monitoring measures that have already been known for a long time, e.g. light barriers for the detection of speed, camera monitoring for the detection crossing of the finishing line or similar, in more recent times it has also been proposed to monitor or control vehicles and the drivers controlling them as well as the vehicle position on the racetrack and the time or distance travelled by electronic data transmission from the vehicle. For example, documents WO 2006/042235 A2 and US 2006/0183405 A1 propose fitting so-called RFID elements to the racing vehicles, i.e. identification components operating with radio data transmission, and to store in said RFID elements a vehicle identification, a driver identification and possibly other vehicle and driver data as well as race data, which are then read out by suitable RFID readers at the racetrack, e.g. so that for each passage through the finishing line the RFID element of a vehicle is read out, the number of laps is correspondingly increased and is stored together with the vehicle identification and the driver identification.

Said document WO 2006/042235 A2 proposes, in addition to said RFID readers, placing conductor loops or light projectors in the roadway in order to detect vehicles driving over them.

If cameras are used for the monitoring of a section of track, it is not easy to manage the resulting image flow and data flow during the recording and to select an image or the few images therefrom that are of interest and which actually show the respective event. For example, high-speed cameras are readily used for the monitoring of the starting process or the finish or another significant section of track, such as, for example, a split time line, a knoll or a steep curve, in order to be able to show the race event of interest in a time loop or to have an image available, which actually shows the racing vehicle just at the instant at which it is passing over the section of track of interest. For racing vehicles traveling at very high speed, with cameras that can only record a limited number of images per second it is clearly not possible in any way to shoot an image accurately at the time at which, for instance, the front of a vehicle is crossing the finishing line. On the down side, this means, however, that a plurality of images and data are produced that are not of interest. If said images are all recorded, a great deal of memory space is required and moreover the later evaluation of the images is made difficult, because large numbers of images and quantities of data have to be checked through or analyzed in order to select an image or the few images which actually show the event to be monitored.

A camera monitoring system for monitoring of the finish in track and field events is known from DE 103 36 447 A1, in which the finishing of a runner itself is detected by means of a light barrier and images of the runner are recorded using a camera while crossing the finishing line. The race number of a respective runner that has crossed the finishing line is subsequently determined using image recognition. Said monitoring system is, however, ultimately unsuitable for monitoring of racing vehicles or cannot cope with the associated race conditions, because as a result of the very much lower speed of runners when crossing the finishing line even with relatively few images per second an image is normally available that actually shows the crossing of the finishing line. Accordingly, processing can take place with very many fewer images to be stored. In order to reliably capture e.g. a crossing of the finishing line with an image for racing vehicles with very much higher speed, the camera, e.g. in the form of a high speed camera, must produce very many images per second, so that as a consequence a very much larger image and data flow is processed. The system mentioned according to DE 103 36 447 A1 is not capable of this.

Furthermore, U.S. Pat. No. 4,183,056 describes an image recording system for monitoring the impact of a tennis ball on or close to a boundary line, wherein the boundary line should be made pressure sensitive in order to detect the impact of the ball and to start the recording of the images permanently delivered by a camera. The recording is then stopped again after the expiry of a predetermined time interval. With this system, however, there is the problem that the recording interval is only set in train with the impact of the ball on the line itself, and thus no images can be recorded or provided, which also show the sequences immediately prior to an interesting event, i.e. no images can be shown that show this ball shortly before its impact. Furthermore, in the event of a signal from the pressure sensitive boundary line, a marker is supplied in the associated camera image and recorded therewith, so that during a subsequent playback the marker can be seen in the image and the time of the ball's impact can be indicated exactly. For image analysis or evaluation such an associated storage of a corresponding marker is, however, only conditionally adequate, because large quantities of data occur and relatively long search times arise for a corresponding image evaluation. In addition, said system is less suitable for monitoring racing vehicles, because for an automobile race or a motorcycle race those fractions of a second after the crossing of the finishing line are of less interest, but those fractions of a second prior to crossing the finishing line are of greater interest and are thus to be stored.

SUMMARY

On this basis the object of the present invention is to provide an improved device of the above-mentioned type, which avoids the disadvantages of the prior art and can be further developed in an advantageous manner. In particular, automatic camera monitoring of the traversing of a section of track of interest with high accuracy is enabled, without having to store large numbers of images and quantities of data and without having to take into account tedious, complex evaluation processes.

According to the invention, said object is achieved with a device as claimed in claim 1 and a method as claimed in claim 12. Preferred embodiments of the invention are the subject of the dependent claims.

It is thus proposed to restrict the recording of the images provided by the camera to a defined time window, which is selected to be around the traversing of the section of track of interest or in proximity thereto, and thereby to detect the actual traversing of the section of track with a sensor device that is separate from the camera in order to be able to suitably mark the image acquired at the time of the actual traversing of the section of track, as long as it lies within said time window. According to the invention, a recording controller for the automatic recording of the images provided by the camera only during a defined time window, within which a traversing of the section of track is to be determined, a sensor device for the detection of the traversing of the section of track and a marking device for the marking of a recorded image depending on a sensor signal of the sensor device and its impact in the determined time window are provided. On the one hand the quantity of data to be stored and evaluated is limited through the restriction of the image recording to a limited time window. On the other hand, through the generation of a marker for a determined image depending on a sensor signal, which indicates the traversing of the section of track of interest, and the storing of said marker in an event list significantly simplifies the locating of the final image of interest, because the image associated with the respective marker is only to be selected from the stored images, so that for the reproduction of the race event of interest only the marked image and possibly some images or image sequences, which have been recorded before and after the marked image, have to be played back. Here the stored images themselves do not have to be searched for the presence of a marker, but only the event list in which the respective markers are deposited has to be gone through. Using a marker read out of the marker list, the image associated therewith can then be selected, which image then displays the respective event such as e.g. the crossing of the finishing line. The storage of the markers separately from the associated images or the images combined therewith in an event list significantly reduces the quantity of data to be processed during race evaluation and correspondingly reduces the access and evaluation times.

Accordingly, for monitoring the racetrack a plurality of cameras and/or high speed cameras can also be used, which produce a large flow of images without the storage and evaluation process being hindered thereby. On the other hand, simple monitoring of a correct race procedure can be achieved by the said marking technique and its interaction with the recording in a defined time window, because the images recorded in the corresponding time window only have to be checked for whether one of the images carries a corresponding marker. In other words, if none of the recorded images are provided with a marker, this leads to the conclusion that a corresponding event did not occur in the predetermined time window. In particular, this can be used for determining false starts or premature starts.

In a development of the invention the recording controller can determine the time window, within which the images provided by the camera are recorded, in different ways. For this purpose the controller can comprise various determination devices for the determination of the start and end of the time window. In particular, the controller can comprise a determination device for the automatic determination of the start and end of the time window depending on a racing vehicle position and/or a race event.

In an advantageous development of the invention the recording controller can determine said time window depending on a start signal and/or on a start preparation signal, wherein for the determination of the time window, e.g. the signals of a starting light can be taken into account. Advantageously, said determination device can comprise detection means for the detection of a start preparation signal and/or a start signal as well as a timer or a timing controller for the output of an end signal for the time window after the expiry of a predetermined time interval following the detection of the start preparation signal and/or of the start signal. If e.g. a starting light known from Formula 1 is used, with which an increasing number of red lights is initially illuminated for displaying the preparation for starting and then the start signal is indicated by a green light, said time window can be opened with one of the red lights and closed again after the expiry of a predetermined time interval following receipt of the green light. If on the other hand, e.g. on a slot car track, the power supply of the track is only applied shortly before outputting the start signal, the time window can be opened or started for the recording of the camera images by said determination device if corresponding voltage and/or current detection means detects the application of the electrical power to the power supply contacts of the slot car track.

In a development of the invention, the time window for the starting process is hereby opened at a predetermined time interval before the actual start signal, e.g. by detection of the red light of a traffic light or the activation of the power supply of the slot car track, wherein advantageously said time window is closed again with the output of the start signal or just after the output of the start signal, so that a normal traversing of the starting line following the output of the start signal is no longer detected at all or a marker is no longer applied to the recorded images. The quantities of data can thus be further reduced or a simple detection of a premature start is enabled, because during evaluation of the recorded images no marker is detected, enabling a proper starting process to be deduced. In particular, for this purpose said time window for the recording of the camera images is closed again by the start signal before the expiry of a normal human reaction time interval. For example, said time window can be closed again a few fractions of a second after the output of the start signal, e.g. after 100 ms. Each conformant starting process having a human reaction time leads to an actual crossing of the starting line at a point in time that is outside the specified time window. Accordingly, the sensor device only outputs the signal indicating the crossing after the end of the recording, so that no further recorded image can be marked by the marking device.

According to a further advantageous embodiment of the invention, said time window can also be specified in a different manner, in particular for the determination of a crossing of the starting line or a split time recording, for which purpose said recording controller comprises a suitable differently designed determination device for the determination of the time window. In an advantageous development of the invention, said determination device can comprise detection means for the detection of the approach of a racing vehicle to the predetermined section of track and detection means for the detection of the departure of the racing vehicle from the predetermined section of track and can specify said time window for the recording of the camera images depending on the signals of said detection means. Alternatively or additionally, the determination device could also comprise a timer or a timing sequence controller, which determines the end of the time window after the expiry of a predetermined time interval from detection of the approach of the racing vehicle to the section of track. If it is detected e.g. by said detection means for the detection of the approach that a racing vehicle has reached or traversed a predetermined section before the section of track of interest, it can be concluded therefrom that for normal operation the section of track of interest has been traversed within a predetermined time interval. However, a determination of the time window with the aid of both the detection of the approach and also the detection of the departure of the racing vehicle is more accurate and independent of speed, wherein said timer may nevertheless be able to be used in order to carry out a plausibility check on the detection of the approach and the detection of the departure of the racing vehicle towards or away from the predetermined section of track.

In an advantageous development of the invention, the approach and the departure of the racing vehicle towards or away from the section of track of interest can be detected by means of sensors disposed on the racetrack before and after said section of track. The sensor signal of the sensor disposed before the section of track indicates the approach of the racing vehicle, whereas the sensor disposed after the section of track of interest indicates the departure of the racing vehicle from said section of track. Said signals of the sensors can be used as a trigger signal for starting the recording or for ending the recording of the images provided by the camera.

Said sensors can be of fundamentally different design here, wherein in an advantageous development of the invention inductive sensors are disposed before or after the section of track to be monitored in order to detect the approach or the departure of the racing vehicle towards or away from said section of track. An optical sensor, e.g. in the form of a light barrier, can also be used alternatively or additionally to such an inductive sensor. In order to be able to detect not only the approach or the departure of a racing vehicle as such, but also moreover to be able to record continuous information, intelligent sensors can also be used, in particular in the form of an RFID reader and/or of a barcode reader, so that not only the approach or the departure of a racing vehicle can be detected, but which racing vehicle is approaching or departing can also still be detected by reading an RFID element or barcode element attached to the vehicle.

Similarly to said sensors for the determination of the time window for the recording of the camera images, the sensor device for the determination of the actual traversing of the section of track to be monitored can also be of a different design. Advantageously, said sensor device for the detection of the traversing of the section of track to be monitored can comprise an optical sensor, preferably in the form of a light barrier, which can very precisely detect the exact point in time of the traversing and can provide the corresponding sensor signal sufficiently rapidly. Alternatively or additionally, said sensor device can, however, also comprise other sensors, such as e.g. inductive sensors or even said RFID reader or barcode reader, in order to also detect the vehicle identity. But in order to be able to measure the passage of the racing vehicle with adequate precision and to provide the sensor signal suitably rapidly, said optical Sensor in the form of a light barrier is especially advantageous. Said further sensors, e.g. RFID readers or barcode readers, can advantageously be additionally provided in order to be able to determine the vehicle identity.

In an advantageous development of the invention, said sensor devices for the detection of the approach and departure of the racing vehicles and the detection of the exact traversing of the section of track of interest can be integrated into the roadway and/or disposed under the roadway. In order to ensure simple mounting here, said sensor devices can be mounted on a common sensor support, which can preferably be laterally inserted from the edge of the roadway into an accommodation space under the roadway.

In order to be able to restrict a subsequent playback of the recorded images to the actual images of interest, in a development of the invention a playback controller for the automatic playback of recorded images can be provided, which comprises a marker reader, which reads or detects the markers attached to the images. By means of suitable selection means the playback controller can then select those stored images that have a marker, wherein image sequences stored shortly before and after a marked image can optionally be selected therewith and displayed. Advantageously, the playback controller can control the playback of the recorded images depending on the markers read out, in particular in such a way that image sequences selected for the playback can then be slowed or stopped in the manner of a slow motion representation, if a marked image is being played back. Alternatively or additionally, a rewind and a repeated playback of the corresponding image sequence can also be carried out if a marked image is being played back, e.g. in order to show the crossing of the finishing line a second time.

BRIEF DESCRIPTION OF THE DRAWINGS

The invention is explained in detail below using a preferred example embodiment and associated drawings. The drawings show.

DETAILED DESCRIPTION

Figure 3:
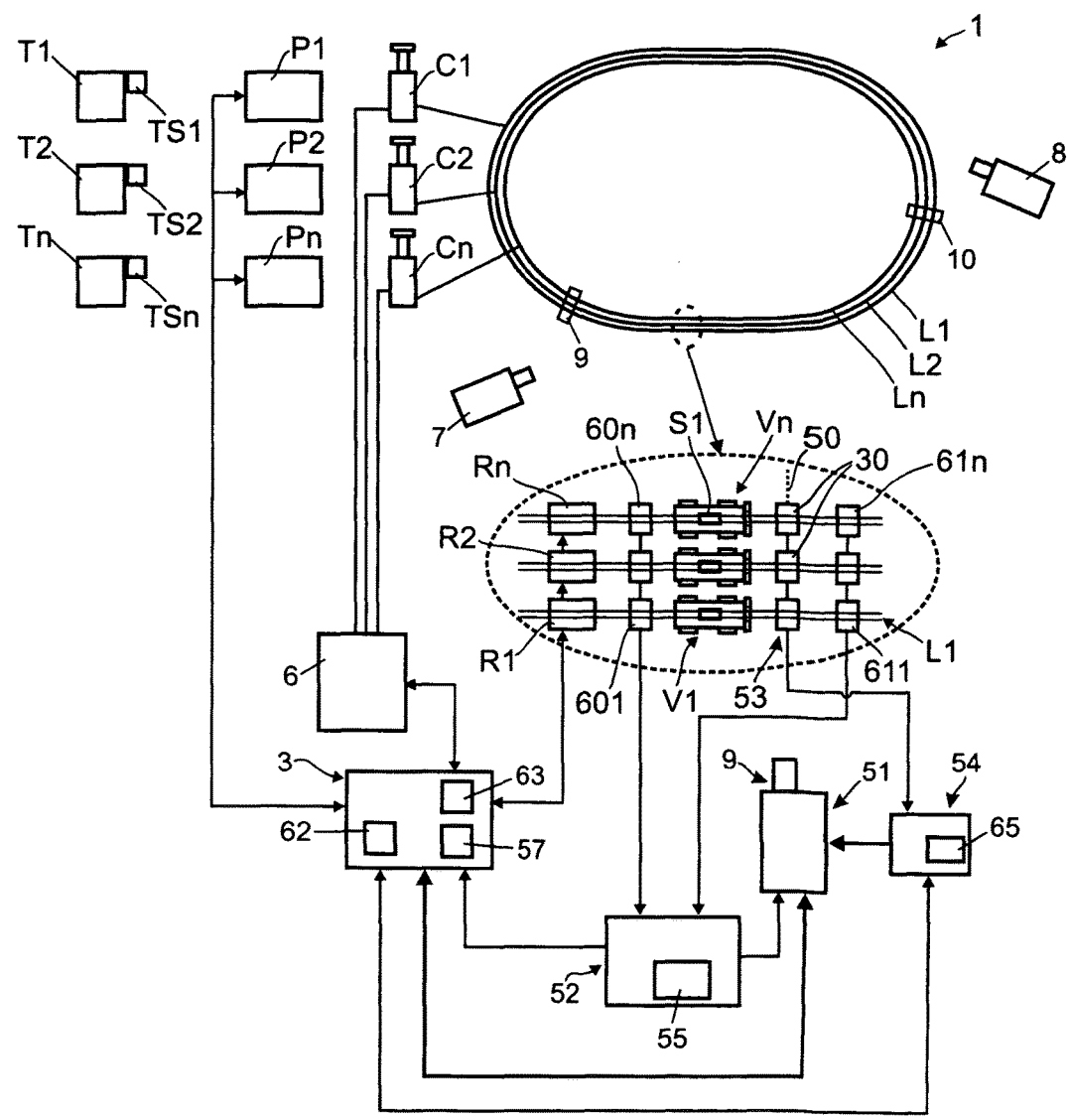
FIG. 3: a schematic illustration of a multi-track racetrack, its monitoring by means of a plurality of cameras and the connection of the monitoring device from FIG. 1.

The racetrack 1 shown in FIG. 3 comprises a plurality of lane tracks L1, L2, Ln and can advantageously be in the form of a so-called slot car track, on which racing vehicles V1, V2, Vn having current pickups run in tracks, which tracks are let into the roadway of the racetrack 1. In a conventional manner, power supply lines are set into said lane tracks (not shown in detail), whose current or voltage application can be controlled by a controller C1, C2, Cn connected therewith, wherein the current or voltage supply of each lane track L1, L2, Ln can be controlled or regulated independently of the other lane tracks.

As FIG. 3 shows, the racetrack 1 in the illustrated embodiment has two associated cameras 7 and 8, which monitor various sections of the racetrack 1 in order to be able to transmit each race in the form of television images, as will be explained.

Advantageously, competitors can be registered for the racetrack 1 with the aid of a central computer 3. The race can be carried out in various versions, e.g. it can be an objective to determine the fastest driver in each case, i.e. that driver who has controlled a racing vehicle controlled by him along a defined section of track of the automobile racetrack in first place. Alternatively or additionally, the number of laps achieved over a predetermined time can determine the result of the race.

Each competitor T1, T2, Tn is first allocated a competitor memory TS1, TS2, TSn, preferably in the form of an RFID card with a respective driver identity TID1, TID2, TIDn, wherein before the race the registration of each competitor takes place by a suitable receiver and/or reader, e.g. in the form of an RFID reader, reading the respective competitor memory TS1, TS2, TSn, wherein the respective allocated driver identity TID is determined and is stored in a first memory area of a central database.

Furthermore, the racing vehicles V1, V2, Vn are provided with a respective vehicle memory S1, S2, Sn, preferably in the form of an RFID element, which is allocated a respective vehicle identity. In a further step, likewise before the running of the race, registration of the vehicle identities is carried out by reading out of the vehicle memory S1, S2, Sn by means of a suitable receiver or reader, wherein the vehicle identities are determined and transferred to said database, where they are deposited in a second memory area.

Following successful registration of the racing vehicles V1, V2, Vn and the competitors T1, T2, Tn, the central computer 3 automatically performs the allocation of the competitors to the racing vehicles before the start of the race and displays this allocation on a display. For this the computer 3 can comprise a random number generator, which carries out the allocation of the competitors to the racing vehicles on a random basis.

Advantageously, the computer 3 also automatically carries out an allocation of the racing vehicles to the respective lane tracks, wherein advantageously said allocation to the lane tracks can also be carried out on a random basis from the random number generator. Said allocation is also displayed on the display before the start of the race.

According to the predetermined allocation and selection, the racing vehicles V1, V2, Vn are then to be placed on the corresponding lane tracks L1, L2, Ln of the racetrack 1. The correct placement of the racing vehicles is monitored by means of the respective vehicle memories provided on the vehicles, wherein advantageously the respective lane tracks L1, L2, Ln have associated receivers/readers R1, R2, Rn, e.g. these are set therein or attached thereto, in order to read out the vehicle memory S1, S2, Sn of the vehicle that is located on the respective lane track. Said receivers/readers R1, R2, Rn monitor the vehicle identity and forward the same to an activation device, which can be disposed in the computer 3 or said controllers C1, C2, Cn. If the correct vehicle is on the correct lane track, the corresponding lane track and the corresponding vehicle are activated.

Furthermore, at the controllers C1, C2, Cn, the competitor memory TS1, TS2, TSn of the competitors being handled by the respective controller C1, C2, Cn is read out by means of receivers/readers P1, P2, Pn provided there. This can e.g. be carried out in such a way that the respective competitor inserts his RFID card into the corresponding controller P1, P2, Pn or places it in contactless communication. The read out competitor identities TID1, TID2, TIDn are then likewise sent to said activation device in order to be compared there with the allocation predetermined by the computer 3. If the correct competitor is on the correct controller, the respective controller is activated.

If all competitors are on the predetermined controllers C1, C2, Cn and all racing vehicles V1, V2, Vn are on the correct lane tracks, the computer 3 can generate a corresponding start signal, which is displayed in a suitable manner.

Figure 1:
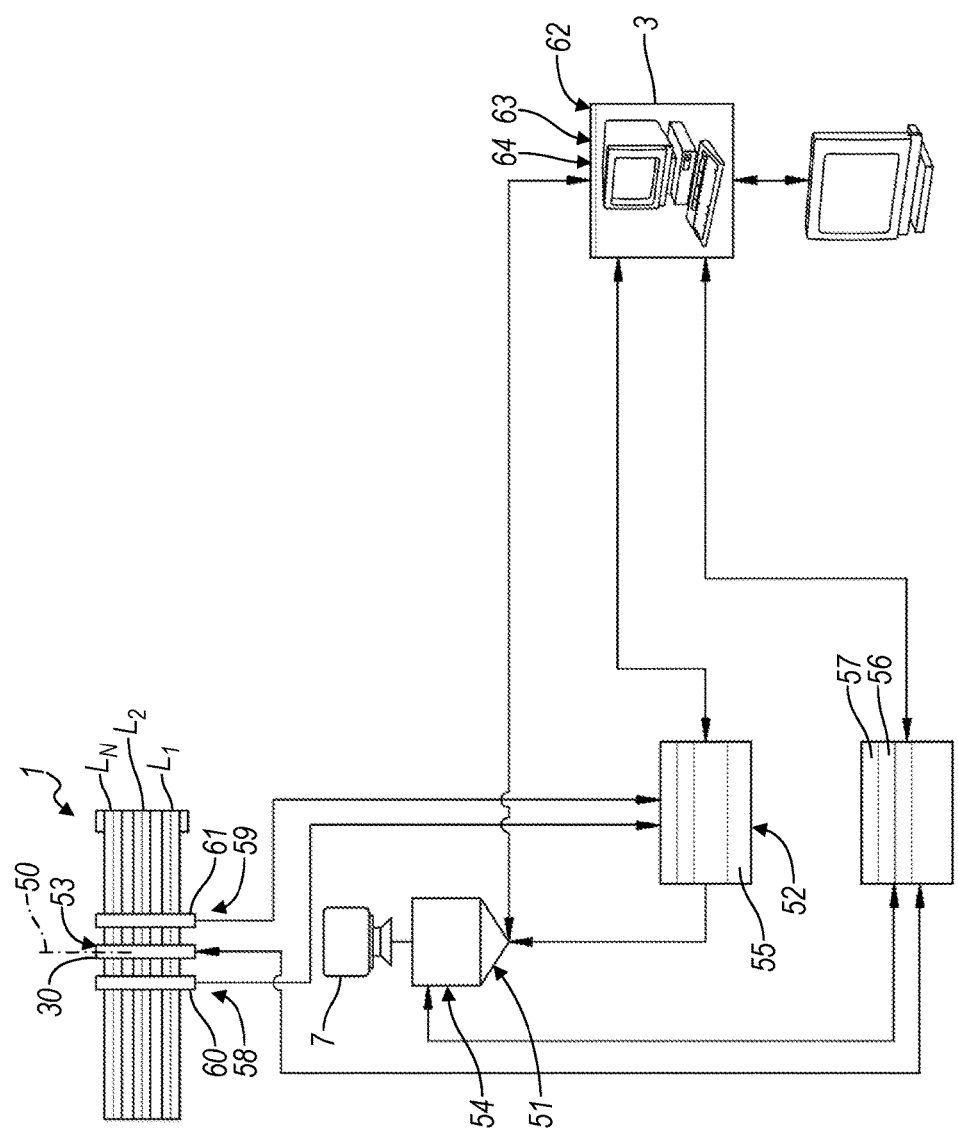
FIG. 1: a schematic illustration of the monitoring device for monitoring the racing vehicles on a racetrack according to an advantageous embodiment of the invention, which shows the cooperation of a camera for the monitoring of the crossing of the starting line and the crossing of the finishing line and the control elements for controlling the recording of the camera images and the repeated playback of the recorded images.
Figure 2:
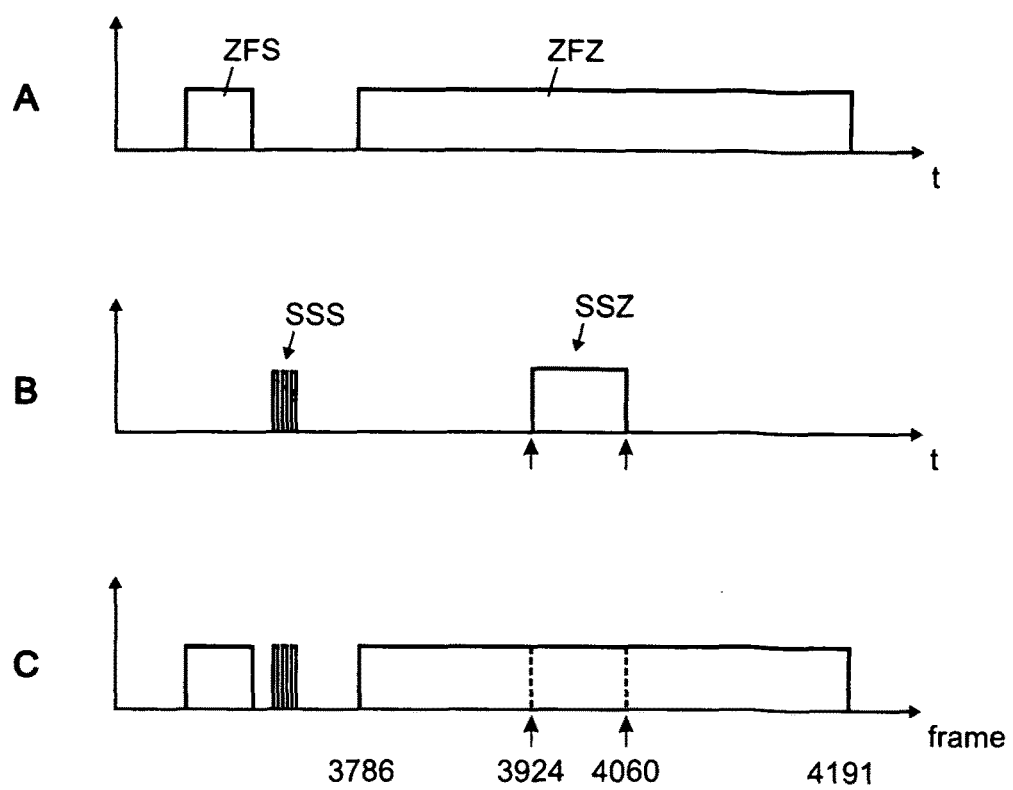
FIG. 2: a timing diagram for illustration of the time window in which images from the camera of the system of FIG. 1 are recorded and the trigger signals, on whose occurrence individual images are marked.

FIGS. 1 and 2 show the device for controlling the camera 7 of FIG. 3 and for recording and reselection of the corresponding images in detail.

At the start said computer 3 first generates a start preparation signal, e.g. by a traffic light being switched to red and/or by the power supply of the racetrack 1 being activated. The computer 3 sends said start preparation signal to a recording controller 52, which controls the recording point in time of the camera 7. On detection of the start preparation signal, said camera 7 is activated or the images provided thereby are recorded in a recording device 51, which can be integrated into the camera.

The computer 3 then gives the actual start signal, e.g. by switching a traffic light indicator to green light. Said signal is in turn processed by said recording controller 52, namely so that the time window for recording the camera images previously opened with the start preparation signal is closed. This can advantageously take place with an offset in time, wherein the time offset can be specified by a timer 57. For example, a delay time of approx. 100 ms from the start signal can be provided. In this way, any premature start would be reliably recorded in the recording device 51, whereas on the other hand no unnecessary images are stored if all vehicles start normally.

The actual crossing of the starting line 50 is detected by a sensor device 53, which e.g. can comprise a sensor 30 provided at the starting line 50, which e.g. can be in the form of an optical sensor and/or of a light barrier. For example, a photo sensor can be disposed in an accommodation space under the roadway, which photo sensor monitors the crossing of the starting line 50 through a transparent sensor window in the roadway, wherein said photo sensor 30 operates as a photoresistor or as a photodiode or even as a phototransistor, which operates by utilizing the internal photoelectric effect, or can even be in the form of a photocell or photomultiplier or of a pyroelectric sensor, which operates by utilizing charge displacements resulting from the temperature change in the event of light absorption.

During crossing of the starting line 50, said sensor device 53 provides a corresponding sensor signal, which is used by a marking device 54 to mark the image recorded at the corresponding moment. If said image lies outside the previously described time window, however, no marking takes place, i.e. in the event of a normal start none of the images are marked. FIG. 2 also shows said course of the image recording and the trigger signals from the sensor device 53, in which the time window $ZF_{Start}$ corresponding to the premature start phase, during which the camera images are recorded, is shown on timeline A. The sensor signals SS Start lie in time just after said time window, so that no marking takes place. In said FIG. 2, partial view B shows the corresponding sensor or trigger signal, whereas partial view C then shows the complete information.

When crossing the finishing line the time window $ZF_{Finish}$ is determined by the determination device 55 with the aid of detection means 58 and 59, which indicate the approach of the racing vehicles to the finishing line 50 as well as the departure from the finishing line following the crossing. As FIG. 1 shows, sensors 60 and 61 are disposed for this purpose on the racetrack 1 a short distance before the finishing line 50 and a short distance after the finishing line, in particular under the surface of the roadway, wherein said sensors can be in the form e.g. of inductive sensors. If the first racing vehicle passes over the approach sensor 60, this provides a signal which is used by the recording controller 52 to activate the camera 7 or the recording device 51. If the last racing vehicle then travels across the finishing line and the departure sensor 61 after the finishing line 50, the corresponding sensor signal is used by the recording controller 52 to close the time window for the recording and to end the recording.

During said time window $ZF_{Finish}$ for the crossing of the finishing line specified by means of the determination device 55, sensor signals SS Finish are then provided by the previously mentioned light barrier sensor 30 if the racing vehicles are actually traveling across the finishing line 50. Said trigger signals are illustrated in FIG. 2 on timeline B and on timeline C and indicate in the example embodiment shown the crossing of the finishing line by the first racing vehicle and the second racing vehicle.

The images "3924" and "4060" recorded at the corresponding points in time are provided with a marker by said marking device 54.

The repeated playback of the recorded images is controlled by the control computer 3. Said computer 3 registers the crossings of the finishing line by means of a time measurement unit 65, which is connected to said finishing line crossing sensors 30. If the automobiles are at the finish, the camera 7 or the recording device 51 is interrogated by the computer 3 regarding the occurring events. Said query provides the event list shown against time as illustrated in FIG. 2, partial view C. The control computer 3 can then play back the requested images, wherein the markers, read by a marker reader 63, on the images can be used by the playback controller 62 during playback, e.g. just during the crossing of the finishing line by a vehicle to stop or to delay or to reverse the image sequence and to play it back again.

What is claimed is:

1. A method for detection, monitoring and/or controlling of racing vehicles on a racetrack, the method comprising:
monitoring a respective racing vehicle with at least one camera when traversing a predetermined section of track,
recording images provided by the camera in a recording device, wherein the images provided by the camera are only recorded during a defined time window, when a traversing of the section of track to be determined,
detecting an actual traversing of the predetermined section of track by the racing vehicle by a physical sensor device located adjacent the section of track to be determined and separate from the camera, wherein a sensor signal is output by the sensor device upon a moment of a racing vehicle drives over the predetermined section of track,
marking an image made by the camera at the moment of the output sensor signal from the sensor device, when the output sensor signal is in the defined time window, with a marker;
saving the marked image in an image storage associated with a computer, and separately storing the marker linked with the respective marked image in an event list associated with the computer; and
retrieving an image by choosing a marker from the event list to select and retrieve the image associated with the marker from the saved marked images in the image storage;
wherein the recording controller comprises a determination device for automatic determination of a start and an end of the time window depending on a racing vehicle position and/or a race event, the determination device having a start sensor disposed on the racetrack for the detection of an approach of the racing vehicle, and an end sensor disposed on the racetrack for the detection of a departure of the racing vehicle from the predetermined section of track, wherein the time window is specified depending on the signals of said start and end sensors.

2. A device for the detection, monitoring and/or controlling of racing vehicles on a racetrack comprising:
at least one video camera for the monitoring of a traversing of a predetermined section of track by a racing vehicle,
a recording device for recording images provided by the video camera,
a recording controller for automatically recording of the images provided by the video camera only during a predetermined time window, within which a traversing of the section of track is to be determined,
a physical sensor device separate from at least one video camera for detection of the racing vehicle traversing of the predetermined section of track and providing a sensor signal at the time of driving over the predetermined section of track,
a marking device for generating a marker associated with an image of the video camera at a moment of an occurrence of the sensor signal of the sensor device when said sensor signal occurs within the predetermined time window, and
a storage device having storage for markers which are saved in an event list, and a separate storage for the associated images;
wherein the event list can be searched for a desired marker and the associated image retrieved;
wherein the recording controller comprises a determination device for automatic determination of a start and an end of the time window depending on a racing vehicle position and/or a race event, the determination device having a start sensor disposed on the racetrack for the detection of an approach of the racing vehicle, and an end sensor disposed on the racetrack for the detection of a departure of the racing vehicle from the predetermined section of track, wherein the time window is specified depending on the signals of said start and end sensors.

3. The device as claimed in claim 2, wherein the marker is an image number for an individual image and using an image number read out from the event list, the image associated with said image number, which shows a traversing of the section of track, can be selected.

4. The device as claimed in claim 2, wherein the start and end sensors generate a start preparation signal and/or a start signal as well as a timer for outputting an end signal after expiry of a predetermined time interval starting from the detected start preparation signal and/or the detected start signal.

5. The device as claimed in claim 4, wherein the detection means for the detection of a start preparation signal further comprises a current and/or voltage sensor for the detection of an application of current to lane tracks of the racetrack.

6. The device as claimed in claim 4, wherein the time window has a starting time before the start signal, at or after the start preparation signal, and an end time after the start signal, but before the expiry of a predetermined reaction time interval.

7. The device as claimed in claim 2, wherein said start and end sensors comprise an inductive sensor and/or an RFID reader and/or an optical sensor.

8. The device as claimed in claim 2, wherein the sensor device for the detection of the traversing of the predetermined section of track comprises a third sensor between the start sensor for the detection of the approach and the end sensor of detecting the departure of the racing vehicle from the section of track.

9. The device as claimed in claim 2, wherein the start and end sensors for the detection of the traversing of the predetermined section of track comprises an optical sensor.

10. A device for rendering of recorded images, which images are provided with a label by a marking device, the device comprising:
- at least one video camera for monitoring of a traversing of a predetermined section of track by a racing vehicle,
- a recording device for recording the images provided by the video camera, a recording controller for automatically recording of the images provided by the camera only during a predetermined time window, within which a traversing of the section of track is to be determined,
- a sensor device separate from at least one camera for detection of the racing vehicle traversing of the predetermined section of track and providing a sensor signal at the time of driving over the predetermined section of track,
- a marking device for generating a marker associated with an image of the video camera at a moment of an occurrence of the sensor signal of the sensor device when said sensor signal occurs within the predetermined time window,
- a storage device having storage for markers which are saved in the event list, and a separate storage for the associated images; and
- a playback controller for automatically rendering of recorded images the playback controller including a marker reader for the reading of markers associated with the images, and selecting images associated with a marker to be played back from the stored images using the marker reader;
wherein the recording controller comprises a determination device for automatic determination of a start and an end of the time window depending on a racing vehicle position and/or a race event, the determination device having a start sensor disposed on the racetrack for the detection of an approach of the racing vehicle, and an end sensor disposed on the racetrack for the detection of a departure of the racing vehicle from the predetermined section of track, wherein the time window is specified depending on the signals of said start and end sensors.

* * * * *